United States Patent
Kearney et al.

(10) Patent No.: US 11,072,319 B2
(45) Date of Patent: Jul. 27, 2021

(54) DEVICE AND METHOD FOR BRAKING AND STOPPING A VEHICLE IN AN EMERGENCY

(71) Applicant: Robert Bosch GmbH, Stuttgart (DE)

(72) Inventors: Norbert Kearney, Abstatt (DE); Steffen Zechmeister, Bad Wimpfen (DE); Steffen Ackermann, Vaihingen/Enz (DE); Thorsten Huck, Murr (DE); Volker Weeber, Lauffen (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 16/388,265

(22) Filed: Apr. 18, 2019

(65) Prior Publication Data
US 2019/0322262 A1    Oct. 24, 2019

(30) Foreign Application Priority Data
Apr. 20, 2018    (DE) .................. 10 2018 206 075.4

(51) Int. Cl.
*B60T 13/74*    (2006.01)
*B60R 16/033*    (2006.01)

(52) U.S. Cl.
CPC ............ *B60T 13/74* (2013.01); *B60R 16/033* (2013.01); *B60T 2270/402* (2013.01); *B60T 2270/414* (2013.01)

(58) Field of Classification Search
CPC ............ B60T 13/74; B60T 2270/414; B60T 2270/402; B60T 13/662; B60T 17/22; B60T 8/88; B60R 16/033; B60R 16/03; G06F 7/70

USPC ............................................. 701/70
See application file for complete search history.

(56) References Cited

U.S. PATENT DOCUMENTS

| | | | | |
|---|---|---|---|---|
| 5,961,190 A * | 10/1999 | Brandmeier | ............ | B60T 7/042 303/152 |
| 6,016,694 A * | 1/2000 | Decker | .................. | B60T 7/104 73/121 |
| 6,131,450 A * | 10/2000 | Decker | .................. | B60T 7/104 73/121 |
| 6,227,626 B1 * | 5/2001 | Blattert | ................ | B60T 13/741 303/20 |
| 7,819,210 B2 * | 10/2010 | Tonoli | .................. | B60W 10/08 180/65.21 |
| 8,215,725 B2 * | 7/2012 | Jackson | ............... | B60T 8/1708 303/124 |
| 9,428,159 B2 * | 8/2016 | Heise | ...................... | B60T 7/107 |

* cited by examiner

*Primary Examiner* — Shardul D Patel
(74) *Attorney, Agent, or Firm* — Maginot, Moore & Beck LLP

(57) ABSTRACT

A device for braking a vehicle includes an actuator configured to control a brake of the vehicle for braking the vehicle. The device further includes a first battery configured to be electrically connected to the actuator via a first switching device and to supply energy to the actuator. The device further includes a second battery configured to be electrically connected to the actuator via a second switching device and to supply energy to the actuator. The device further includes a controller configured to detect a state of the energy supplied to the actuator by the first battery and switch the second switching device to electrically connect the second battery to the actuator instead of the first battery in order to supply energy to the actuator when the state indicates that a need exists.

12 Claims, 4 Drawing Sheets

DEVICE AND METHOD FOR BRAKING AND STOPPING A VEHICLE IN AN EMERGENCY

This application claims priority under 35 U.S.C. § 119 to patent application no. DE 102018206075.4 filed on Apr. 20, 2018 in Germany, the disclosure of which is incorporated herein by reference in its entirety.

The disclosure is based on a device and a method for braking and stopping a vehicle in an emergency, in particular by means of an automated parking brake.

BACKGROUND

In the event of failure of a central energy supply for the automated parking brake, the vehicle must continue to be safely braked. This is particularly necessary if it is used in a highly or fully automated driving operation, in order to be able to brake safely in the event of an on-board power supply failure.

SUMMARY

This is achieved by the device and the method described in the disclosure.

A suitable device for braking a vehicle comprises an actuator which is designed to control at least one brake of the vehicle for braking the vehicle, a first battery, which can be electrically connected to the actuator via a first switching device to supply energy to the actuator, wherein it is provided that the device comprises a second battery and a second switching device, wherein the second battery can be electrically connected to the actuator via the second switching device to supply energy to the actuator, wherein the device comprises a controller which is designed to carry out a method having the following steps: detecting a state of the energy supply of the actuator by the first battery, switching the second switching device to electrically connect the second battery instead of the first battery to the actuator, in order to supply energy to the actuator if the state indicates that a need case exists. As a result, even in the event of a failure of a central energy supply, triggered either by a conductor breakage or a defective battery, the device is switched over to a backup energy storage device (here: referred to as the 2nd battery).

The controller is preferably designed to detect a first voltage which is present at the input of the first switching device, wherein the controller is designed to detect the fault case in the energy supply of the actuator if the first voltage falls below a first threshold value, and/or that the controller is designed to detect a second voltage which is present at an input of the actuator, wherein the controller is designed to detect the fault case in the energy supply of the actuator if the second voltage falls below a second threshold value. As a result, the fault case is reliably detected.

Advantageously, the controller is designed to switch the first switching device to electrically connect the first battery to the actuator for supplying energy to the actuator. This provides an integrated solution, in which the controller, in addition to activating the backup energy storage unit, also controls the switching devices of a braking system, which with the exception of the central energy supply by the first battery, is redundantly designed with regard to the power supply paths.

Advantageously, insulated-gate field effect transistors are arranged in the switching devices, wherein the field effect transistors are electrically conductively connected to each other at the source side. This means that in the event of a fault a reverse flow of current through two of the switching devices is prevented. This enables a reliable measurement of the voltage to detect the fault case, while the power supply via one of the switching devices is ensured.

The controller preferably comprises a first control device and a second control device, wherein the first control device is designed to control the first switching device in a brake control unit, and wherein the second control device is designed to carry out the method with the following steps: detecting a fault in the energy supply of the actuator by the first battery, switching the second switching device to electrically connect the second battery to the actuator for supplying energy to the actuator, wherein the second control device is designed to control the second switching device. This allows a retrofit solution for a braking system, which is redundantly designed with respect to the power supply paths from the central energy supply.

The controller preferably comprises a first control device and a second control device, wherein the first control device is designed to control the first switching device and the second control device and to carry out the method with the following steps: detecting a fault in the energy supply of the actuator by the first battery, switching the second switching device to electrically connect the second battery to the actuator for supplying energy to the actuator, wherein the first control device is designed to control a fourth switching device in a brake control unit. This allows a retrofit solution for a braking system, which requires minimal changes to the power supply paths of the braking system.

The second control device is preferably designed to detect the first voltage which is present at the input of the first switching device, wherein the second control device is designed to detect the fault case in the energy supply of the actuator if the first voltage falls below the first threshold value, and/or that the second control device is designed to detect the second voltage, which is present at an input of the actuator, wherein the second control device is designed to detect the fault case in the energy supply of the actuator if the second voltage falls below the second threshold value. This represents a particularly appropriate retrofit solution for a braking system.

The first control device is preferably connected via a first diode to a positive terminal of the first battery, wherein the first diode is arranged to block a reverse flow of current from the first control device to the positive terminal of the first battery, and wherein a positive pole of the second battery can be electrically connected via the second switching device to the first control device, wherein the first diode is arranged to block a reverse flow of current from the positive terminal of the second battery to the positive terminal of the first battery. As a result, a reverse flow of current is prevented in the event of a fault.

Preferably a second diode is arranged to block a reverse flow of current from the first control device and from the positive terminal of the first battery to the positive terminal of the second battery.

The second control device is preferably designed to transmit a status of the energy supply to the actuator and the second control device. This means that they can adapt their behavior depending on whether or not a fault case is present.

The device preferably has a first earth conductor and a second earth conductor, wherein in a fault-free case the first earth conductor closes an electrical circuit to the negative terminal of the first battery, wherein a third control device is designed to detect an earthing fault in the first earth conductor, and in the event of an earthing fault to close the electrical circuit to the negative terminal of the first battery via the second earth conductor instead of via the first earth conductor. This is a redundancy concept for the first earth conductor, which enables the availability of the automatic parking brake even in the event of a fault in the first earth conductor.

The method carries out the following steps: detecting a state of the energy supply of the actuator by the first battery, switching the second switching device to electrically connect the second battery to the actuator instead of the first battery, in order to supply energy to the actuator if the state indicates that a need case exists.

BRIEF DESCRIPTION OF THE DRAWINGS

Further advantageous embodiments are obtained from the following description and the drawing. The drawings show.

DETAILED DESCRIPTION

Figure 1:
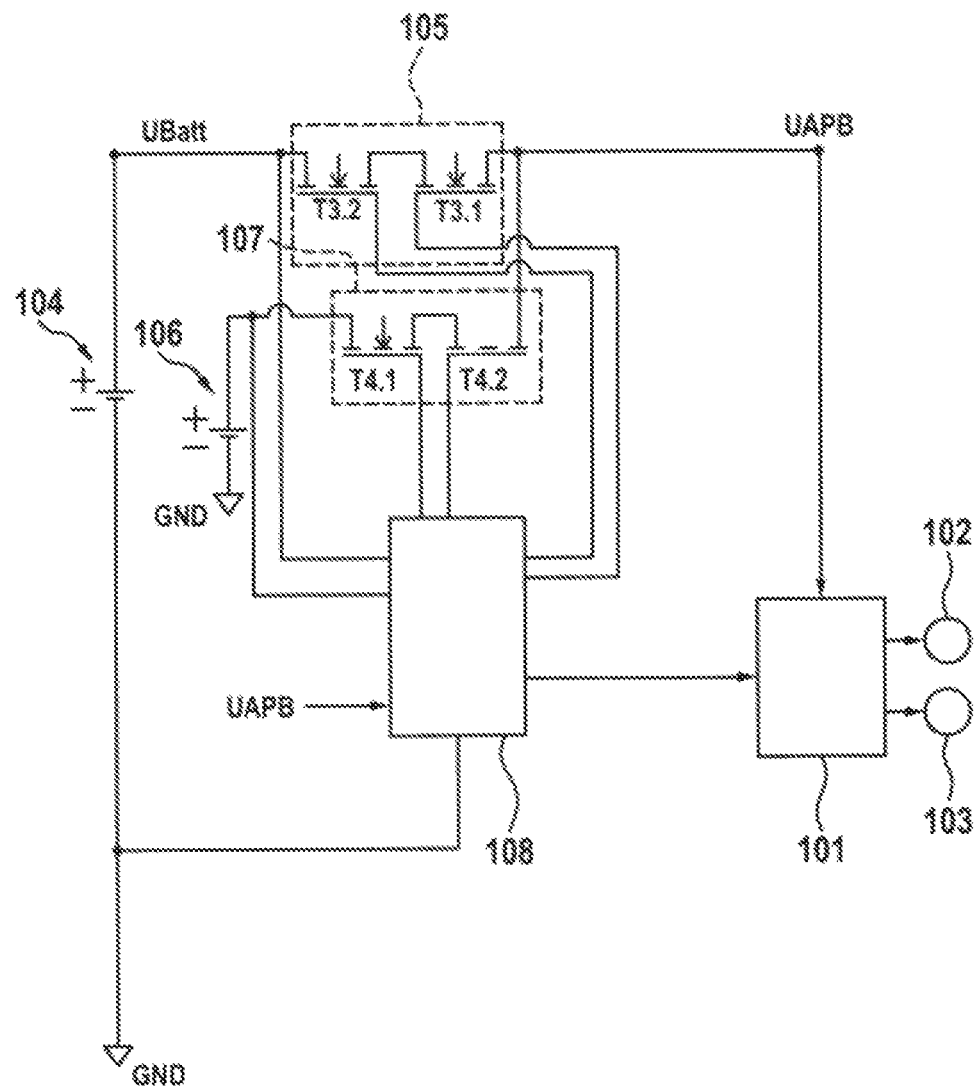
FIG. 1 a schematic diagram of parts of a device for braking a vehicle.

FIG. 1 shows a schematic diagram of parts of a device 100 for braking a vehicle.

The device 100 comprises an actuator 101, which is designed to control at least one brake, in the example a first brake 102 and a second brake 103 of the vehicle, for braking the vehicle. The brake can comprise a brake caliper which is activated. The brake may also be a deceleration device with a parking brake.

A first battery 104 supplies the actuator 101 as a central power supply with the necessary current for the purpose.

To this end the first battery 104 can be electrically connected via a first switching device 105 to the actuator 101 to supply energy to the actuator 101.

In a fault-free operation, the energy supply is provided via this switching device 105.

The device 100 also comprises a second battery 106. The second battery 106 can be electrically connected via a second switching device 107 to the actuator 101 to supply energy to the actuator 101.

The device 100 also comprises a controller 108, which is designed to carry out a method having the following steps: detecting a state of the energy supply of the actuator 101 by the first battery 104, switching the second switching device 107 to electrically connect the second battery 106 to the actuator 101 in order to supply energy to the actuator 101 if the state indicates that a need case exists. In the example the state described is that of a fault case, which characterizes the need case. Another need case may occur, for example, a need for balancing.

The controller 108 is designed to switch the first switching device 105 to electrically connect the first battery 104 to the actuator 101 for supplying energy to the actuator 101. This will implement a central energy supply.

In the example, the controller 108 is designed to detect a first voltage UBatt, which is present at an input of the first switching device 105. The controller 108 in the example is designed to detect the fault case in the energy supply of the actuator 101 if the first voltage UBatt drops below a first threshold value.

Alternatively or additionally, the controller 108 can be designed to detect a second voltage UAPB, which is present at an input of the actuator 101. The controller 108 in this case is designed to detect the fault case in the energy supply of the actuator 101 if the second voltage UAPB falls below a second threshold value.

The first threshold value and the second threshold value are adjusted to the minimum voltage necessary for a safe operation of the actuator 101.

In the example, the first switching device 105 contains a first self-blocking field effect transistor with insulated gate T3.1 and a second self-blocking field effect transistor with insulated gate T3.2.

The first field effect transistor T3.1 and the second field effect transistor T3.2 are electrically conductively connected to each other at the source side in the first switching device 105. In the example, the second switching device 107 contains a first self-blocking field effect transistor with insulated gate T4.1 and a second self-blocking field effect transistor with insulated gate T4.2. The first field effect transistor T4.1 and the second field effect transistor T4.2 are electrically conductively connected to each other at the source side in the second switching device 107.

The field effect transistors have a body diode. In the event of a fault these field effect transistors reliably prevent a reverse flow of current to the first battery 104, i.e. the central energy supply, and to the second battery 106, i.e. the backup energy storage unit.

Figure 2:
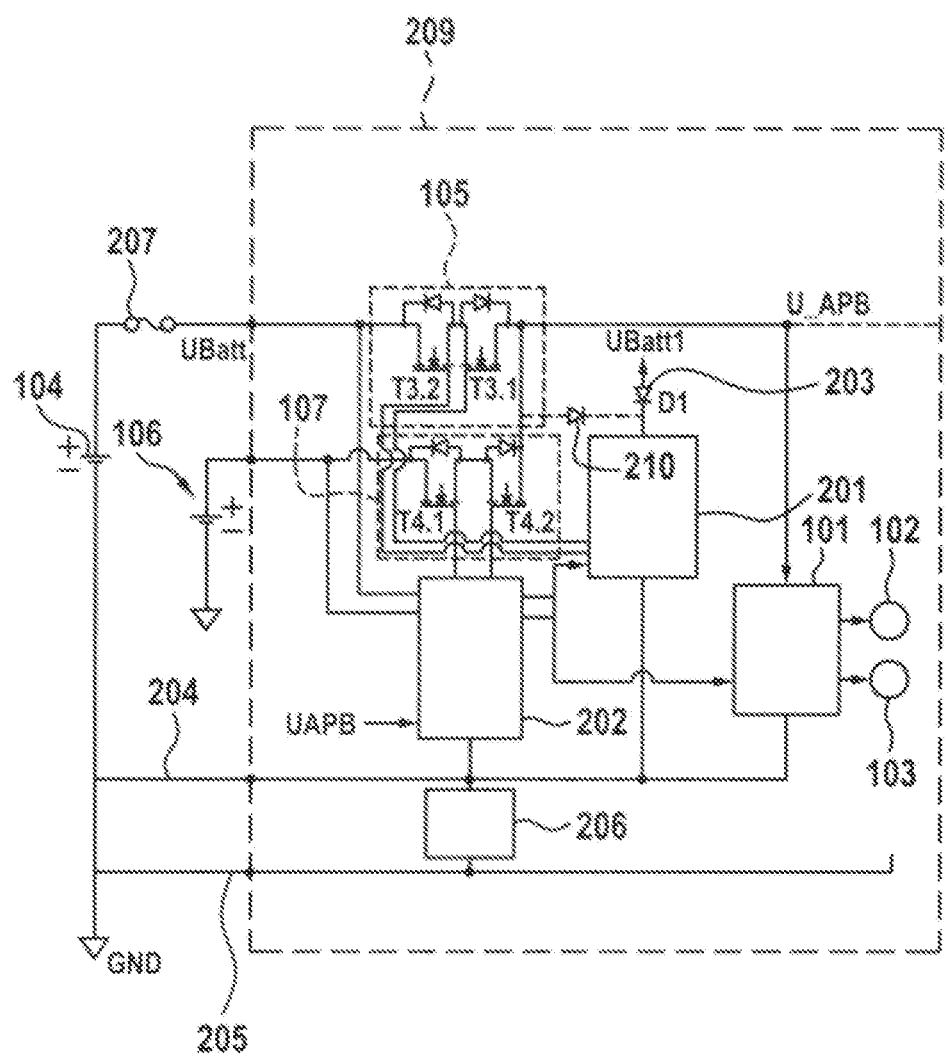
FIG. 2 a schematic diagram of parts of an integrated solution for the device.

FIG. 2 shows a schematic diagram of parts of an integrated solution for the device 100. Elements with the same function as described for FIG. 1 are labeled with the same reference numeral in FIG. 2 and the other figures and will not be described again.

As shown in FIG. 2, a first self-blocking field effect transistor with insulated gate T3.1 and a second self-blocking field effect transistor with insulated gate T3.2 are arranged in the first switching device 105, wherein the first field effect transistor T3.1 and the second field effect transistor T3.2 are electrically conductively connected to each other at the source side in the second switching device 106.

The controller 108 of the integrated solution has a first control device 201 and a second control device 202.

The first control device 201 is designed to control the first switching device 105.

The second control device 202 is designed to control the second switching device 107.

The control devices 201 and 202 can also be combined into one control device.

The second control device 202 is designed to detect the first voltage UBatt, which is present at the input of the first switching device 105.

The second control device 202 is designed to detect the fault case in the energy supply of the actuator 101 if the first voltage UBatt drops below the first threshold value.

The second control device 202 is optionally or alternatively designed to detect the second control voltage UAPB, which is present at the input of the actuator 101.

The second control device 202 in this case is designed to detect the fault case in the energy supply of the actuator 101 if the second voltage UAPB falls below the second threshold value.

The first control device 201 can be electrically connected via a first diode 203 to a positive terminal of the first battery 104.

The first diode 203 is arranged to block a reverse flow of current from the first control device 201 to the positive terminal of the first battery 104.

A positive pole of the second battery 106 can be electrically connected via the second switching device 107 to the first control device 201.

The first diode 203 is arranged to block a reverse flow of current from the positive terminal of the second battery 106 to the positive terminal of the first battery 104.

Optionally, a second diode 210 is arranged to block a reverse flow of current from the first control device 201 and from the positive terminal of the first battery 104 to the positive terminal of the second battery 106.

The second control device 202 is designed to transmit a status of the energy supply to the actuator 101 and the second control device 202.

The device 100 has a first earth conductor 204 and a second earth conductor 205. In a fault-free case the first earth conductor 204 closes an electrical circuit to the negative terminal of the first battery 104.

The device 100 has a third control device 206, which is designed to detect an earthing fault in the first earth conductor 204 and in the event of an earthing fault to close the electrical circuit to the negative terminal of the first battery 104 via the second earth conductor 205 instead of via the first earth conductor 204.

A first fuse 207 can be arranged between the first battery 104 and the first switching device 105.

The integrated solution can comprise all components with the exception of the first battery 104 and optionally also with the exception of the second battery 106 in one housing 209.

Figure 3:
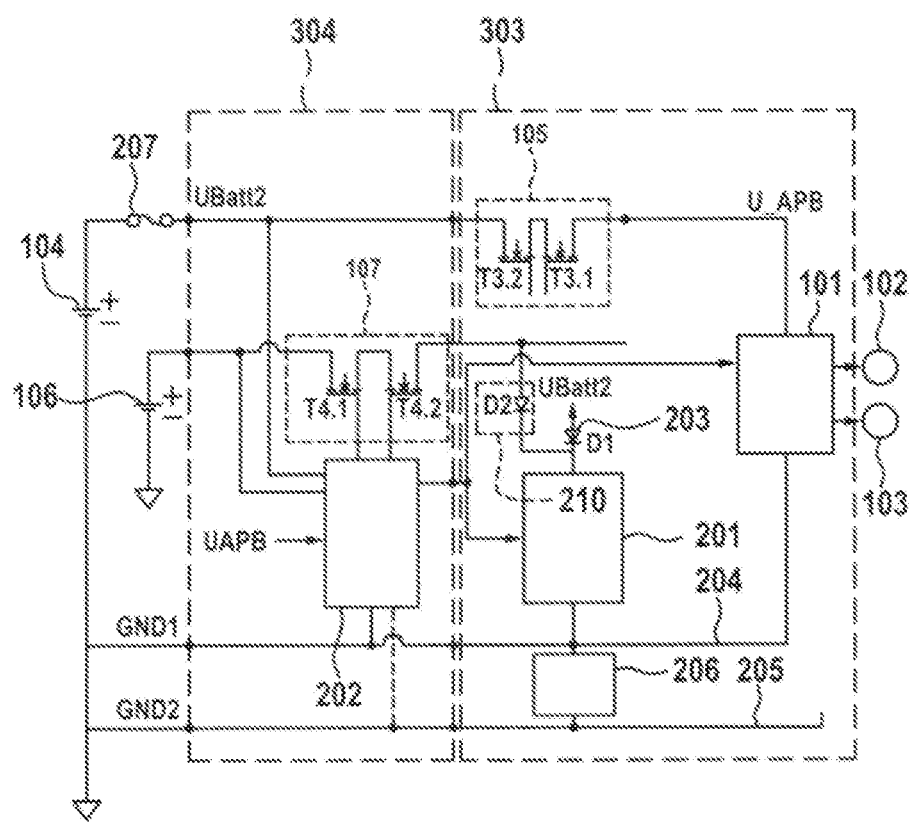
FIG. 3 a schematic diagram of parts of a first retrofit solution.

FIG. 3 is a schematic drawing of parts of a first retrofit solution.

The first control device 201 is designed to control the first switching device 105 in a brake control unit 303.

The second control device 202 is designed to carry out the method with the following steps: detecting the fault in the energy supply of the actuator 101 by the first battery 104, switching the second switching device 107 to electrically connect the second battery 106 to the actuator 101 in order to supply energy to the actuator 101. The second control device 202 is designed to control the second switching device 107. The second switching device 107 and the second control device 202 are arranged, for example, as a separate circuit 304.

Figure 4:
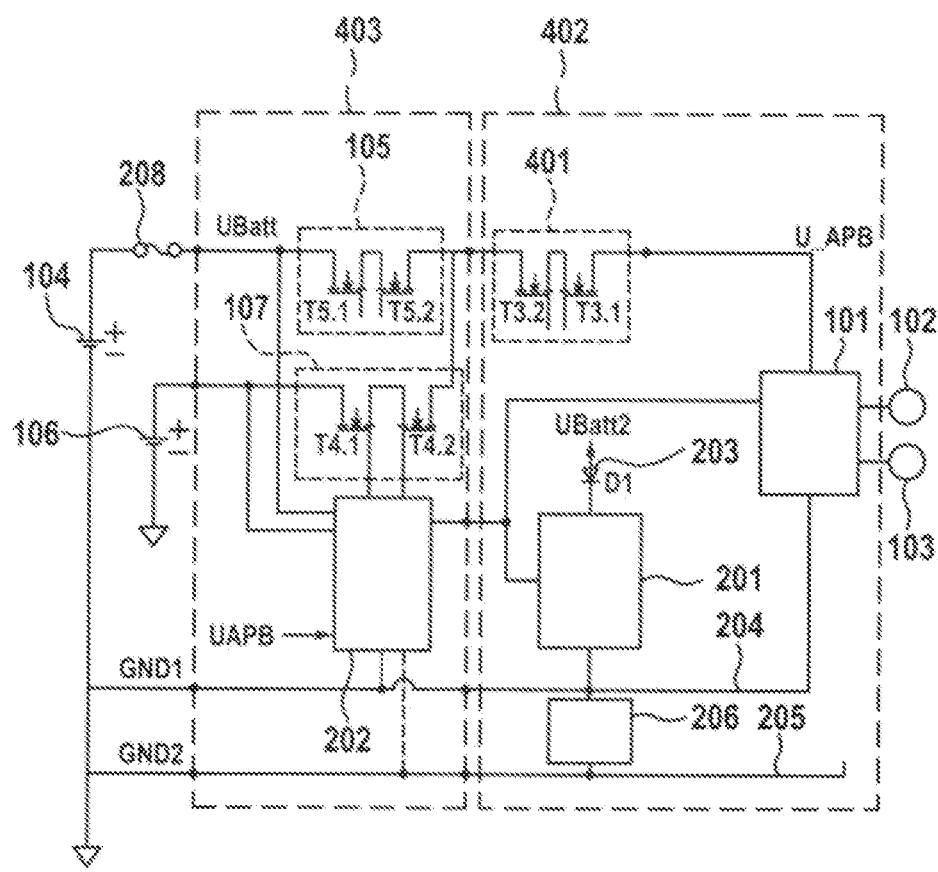
FIG. 4 a schematic diagram of parts of a second retrofit solution.

FIG. 4 shows a schematic diagram of parts of a second retrofit solution.

FIG. 4 shows the first control device 201 and the second control device 202.

The second control device 202 is designed to control the first switching device 105 and the second switching device 107, and to carry out the method with the following steps: detecting the fault in the energy supply of the actuator 101 by the first battery 104, switching the second switching device 107 to electrically connect the second battery 106 to the actuator 101 in order to supply energy to the actuator 101.

The first control device 201 is designed to control a third switching device 401 in a brake control unit 402. More precisely, the first control device 201, the third switching device 401 form the brake control unit 402. This brake control unit 402 is designed to control the automatic parking brake. The third switching device 401 is arranged between the main switch 208 and the actuator 101. The third switching device 401 comprises two insulated-gate field effect transistors that are electrically connected at the source-side. The field effect transistors are, for example, MOSFETS.

The second control device 202 forms a separate circuit 403 with the first switching device 105 and the second switching device 107. The control conductors to the switching devices are not shown in FIG. 4 for reasons of clarity.

Figure 5:
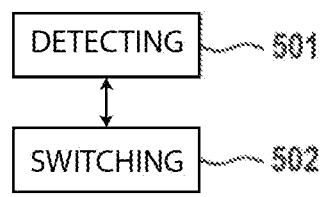
FIG. 5 a schematic diagram of steps in a method for operating the device.

The method for operating the device 100 is shown schematically in FIG. 5 and carries out the following steps: detecting 501 a state of the energy supply of the actuator 101 by the first battery 104, switching 502 the second switching device 107 to electrically connect the second battery 106 to the actuator 101 in order to supply energy to the actuator 101 in the event of a fault. These steps can be performed and repeated in any order.

What is claimed is:

1. A device for braking a vehicle, comprising:
    an actuator configured to control a brake of the vehicle for braking the vehicle;
    a first battery;
    a first switching device configured to be electrically connect the first battery to the actuator to supply energy to the actuator;
    a second battery;
    a second switching device configured to be electrically connect the second battery to the actuator to supply energy to the actuator; and
    a controller configured to:
        detect a state of the energy supplied to the actuator by the first battery; and
        switch the second switching device to electrically connect the second battery to the actuator instead of the first battery based on the detected state of the energy.

2. The device according to claim 1, wherein to detect the state of the energy the controller is further configured to:
    detect a first voltage, as supplied by the first battery, present at an input of the first switching device, and to detect a first fault case in the energy supplied to the actuator by the first battery by comparing the first voltage to a first threshold value; and/or
    detect a second voltage, as supplied by the first battery, present at an input of the actuator, and to detect a second fault case in the energy supplied to the actuator by the first battery by comparing the second voltage to a second threshold value.

3. The device according to claim 1, wherein the controller is further configured to:
    switch the first switching device to electrically connect the first battery to the actuator in order to supply the energy to the actuator from the first battery.

4. The device according to claim 1, wherein:
    each of the first and second switching devices includes a plurality of self-blocking insulated-gate field effect transistors, and
    the field effect transistors of the respective switching device are configured to electrically conductively connect to each other on the source side.

5. The device according to claim 2, wherein the controller includes:
    a first control device configured to control the first switching device, which is included in a brake control unit of the vehicle; and
    a second control device configured to:
        detect the first fault case; and
        switch the second switching device to electrically connect the second battery to the actuator to supply energy to the actuator from the second battery.

6. The device according to claim 5, wherein:
    the second control device is further configured to control the first switching device, and the first control device is further configured to control a third switching device in the brake control unit.

7. The device according to claim 5, wherein the second control device is further configured to:
   detect the first voltage and/or the second voltage; and
   detect the second fault case.

8. The device according to claim 7, further comprising:
   a first diode configured to connect the first control device to a positive terminal of the first battery, the first diode configured to block a first reverse flow of a first current from the first control device to the positive terminal of the first battery,
   wherein a positive terminal of the second battery is electrically connected via the second switching device to the first control device, and
   wherein the first diode is further configured to block a second reverse flow of a second current from the positive terminal of the second battery to the positive terminal of the first battery.

9. The device according to claim 8, further comprising:
   a second diode configured to block a second reverse flow of a second current from the first control device and from the positive terminal of the first battery to the positive terminal of the second battery.

10. The device according to claim 9, wherein the second control device is configured to transmit a status of (i) the state of the energy supplied to the actuator by the first battery, and (ii) the second control device.

11. The device according to claim 5, further comprising:
    a first earth conductor configured to close an electrical circuit to a negative terminal of the first battery based on the detected state of the energy;
    a second earth conductor; and
    a third control device configured to:
       detect an earthing fault in the first earth conductor; and
       close the electrical circuit to the negative terminal of the first battery via the second earth conductor instead of via the first earth conductor based on the earthing fault.

12. A method for operating a device for braking a vehicle, comprising:
    detecting, using a controller, a state of energy supplied to an actuator by a first battery through a first switching device; and
    switching, using the controller, a second switching device to electrically connect a second battery instead of the first battery to the actuator based on the detected state of energy,
    wherein the actuator controls the braking of the vehicle, and
    wherein the second battery is configured to supply energy to the actuator when electrically connected to the actuator by the second switching device.

* * * * *

UNITED STATES PATENT AND TRADEMARK OFFICE
CERTIFICATE OF CORRECTION

PATENT NO. : 11,072,319 B2
APPLICATION NO. : 16/388265
DATED : July 27, 2021
INVENTOR(S) : Kearney Page 1 of 1

It is certified that error appears in the above-identified patent and that said Letters Patent is hereby corrected as shown below:

In the Claims

In Claim 1, at Column 6, Lines 18-19: "configured to be electrically connect" should read --configured to electrically connect--.

In Claim 1, at Column 6, Lines 22-23: "configured to be electrically connect" should read --configured to electrically connect--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*